United States Patent [19]

Ishii

[11] Patent Number: 4,530,653

[45] Date of Patent: Jul. 23, 1985

[54] APPARATUS FOR FORMING EMBOSSED ACOUSTICAL TILE

[75] Inventor: Yasuo Ishii, Chicago, Ill.

[73] Assignee: United States Gypsum Company, Chicago, Ill.

[21] Appl. No.: 625,083

[22] Filed: Jun. 27, 1984

Related U.S. Application Data

[62] Division of Ser. No. 257,066, Apr. 24, 1981, Pat. No. 4,464,656.

[51] Int. Cl.³ .............................................. B29D 7/14

[52] U.S. Cl. ....................................... 425/363; 425/84

[58] Field of Search ................................ 425/84, 363

[56] References Cited

U.S. PATENT DOCUMENTS

| | | | |
|---|---|---|---|
| 3,021,254 | 2/1962 | Helversen et al. | 425/84 X |
| 3,313,002 | 4/1967 | Wyeth | 425/363 X |
| 3,838,001 | 9/1974 | Greiner et al. | 425/84 X |
| 4,005,957 | 2/1977 | Savich | 425/80.1 |
| 4,014,739 | 3/1977 | Granberg | 425/84 X |
| 4,116,594 | 9/1978 | Leanna et al. | 425/363 X |
| 4,126,088 | 11/1978 | Thieme et al. | 425/84 X |
| 4,155,693 | 5/1979 | Raley | 425/363 |
| 4,157,237 | 6/1979 | Raley | 425/363 |

*Primary Examiner*—J. Howard Flint, Jr.

*Attorney, Agent, or Firm*—Kenneth E. Roberts; Robert H. Robinson; Robert M. Didrick

[57] ABSTRACT

Apparatus for making an acoustical tile having a pattern of raised portions and portions in relief on the tile surface is provided by a hollow embossing roll containing the pattern in reverse and interstices communicating from the surface of the roll into the hollow interior of the roll. In operation the roll contacts the formable, acoustical tile fiber composition pulp with sufficient force as to disspell the pulp, vent air that may be between the roll and the pulp surface through the roll, and produce a reversed pattern of the roll upon the pulp surface, then releasing the pulp from the surface of the roll by rotation of the roll.

3 Claims, 5 Drawing Figures

APPARATUS FOR FORMING EMBOSSED ACOUSTICAL TILE

This application is a divisional of U.S. Ser. No. 257,066 filed Apr. 24, 1981, and now U.S. Pat. No. 4,464,656.

BACKGROUND OF THE INVENTION

1. Field of the Invention

This invention relates to the production of fiber composition acoustical tiles and panels for ceiling and wall decoration. More particularly, this invention relates to an apparatus for making acoustical products with highly discrete, finely detailed and sharply delineated three-dimensional patterns in the face of the panel.

2. The Prior Art

One way to form three dimensional patterns, holes and fissures in such panels is to cast a viscous aqueous pulp of fiber composition into a mold, pan or tray and press the surface with a screeding bar or blade, or solid embossing roller as described in U.S. Pat. Nos. 3,246,063 and 1,769,519. More particularly, according to these processes viscous aqueous pulps having a paste consistency similar to that of wet oatmeal are formed of a mixture of granulated mineral wool; a binder, particularly one of an amylaceous nature such as a thick boiling starch; fillers; coloring materials as needed and the like; and mixed with water to about 60–80% solids consistency. Various other materials may be added to give certain additional properties to the finished panel. This pulp is poured onto suitable trays which have been previously covered with a paper or metal foil liner to keep the composition from falling through perforations in the tray; and the trays, on a conveyor line, pass under an oscillating screed bar which tears the wet surface of the composition to form the patterned surface. The action of the bar rips or tears chunks of the granulated mineral fiber and other materials from the wet surface by friction as it passes under the bar. Frequently, it is difficult to adjust the speed of the conveyor line to the speed of the oscillating bar so as to maintain any pattern uniformity; and generally only shallow irregular patterns result.

In using an embossing roll to form such patterns, a solid cylinder is covered with a rubber matrix facing that has been engraved in a desired pattern. As the trays of pasty pulp, moving on the conveyor line, pass under the roll they cause the roll to turn and the pressure of the roll displaces a portion of the pulp under the "hills" portion of the patterned matrix to impress a "valley" design into the viscous aqueous pulp. Due partly to the resiliency and starchiness of the wet pulp, after being compressed within the cavities of the design, the pulp has a great tendency to bounce back towards its original shape upon release of pressure. Thus the patterns produced in this manner are characterized in being rather shallow and "mushy", lacking in fidelity by mushrooming around the detail of the pattern.

In both of these means the rough surface resulting may form the final pattern for the panel. Alternately the surface, after drying and curing of the panel may be sanded or planed to smooth off and flatten the "hills" of the patterns so that only "valleys" remain in a smooth-faced pattern.

Another way to form such panels involves first forming a consolidated water-felted fibrous mat in a continuous process by dewatering a very dilute fiber slurry. During dewatering the consistency of the slurry varies progressively from that of a dilute suspension to a thick fiber slurry or slush in which the fibers are still mobile in response to a moving force and finally to a wet felt in which the fibers are relatively fixed in position in a wet mat. At this latter stage the mat is usually compressed to a desired density for drying; and at that point a screeding bar or a rotating roll may be applied to the surface to produce fissures resembling natural marble or travertine stone. U.S. Pat. No. 4,226,674 discloses a rough texturing of the surface in such a process by making adjustments to the rotary vacuum cylinder picking up the slurry before mat formation and forming a roughly textured surface as the slurry is deposited on the forming screen before consolidating and draining to form a mat.

SUMMARY OF THE INVENTION

It is an object and advantage of the present invention to provide means for making an acoustical tile or panel in which surface patterns are reproduced in high-fidelity three-dimensional detail and accuracy.

In the past, rotating rolls have contained a solid pattern of raised "hills" and lowered "valleys" to pressure impress a pattern into the wet mass. According to the present invention, a surface molding action is applied to the aqueous pulp in a manner as to relieve at least some of the pressure of the substrate within the cavities, or valleys of the design, through the roller. More particularly a hollow core roll is provided to relieve the embossing pressure upon the wet mass through the pattern matrix and into the interior of the roller thereby providing highly discrete and sharply delineated patterns of great fidelity in the pulp. The pulp on which the present invention may be practiced may be a viscous aqueous pulp having a consistency similar to wet oatmeal, but it is not so limited, as will appear hereinafter.

BRIEF DESCRIPTION OF THE DRAWINGS

Generally referring to the drawings, FIGS. 1 and 2 show a panel of the invention exhibiting a deep, vertically-sided and sharp-edged high fidelity reproduction of the design matrix of FIGS. 3 and 4; while FIG. 5 illustrates one preferred embodiment for utilizing a roll having such matrix to obtain such panel.

Figure 1:
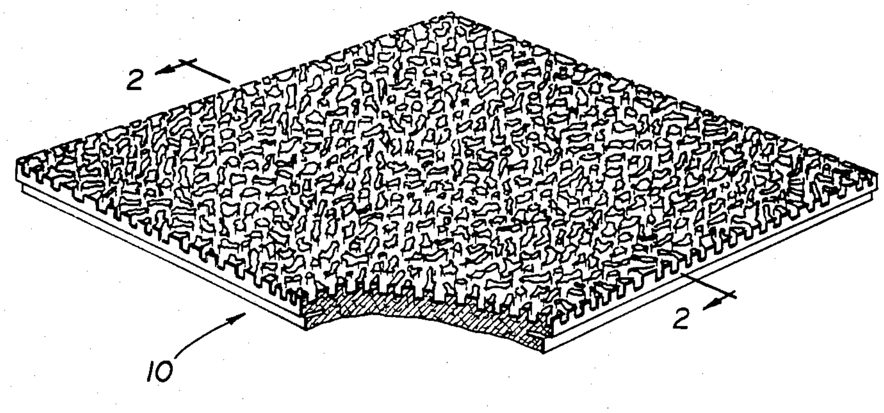
FIG. 1 represents an acoustical tile made by the present invention.
Figure 2:
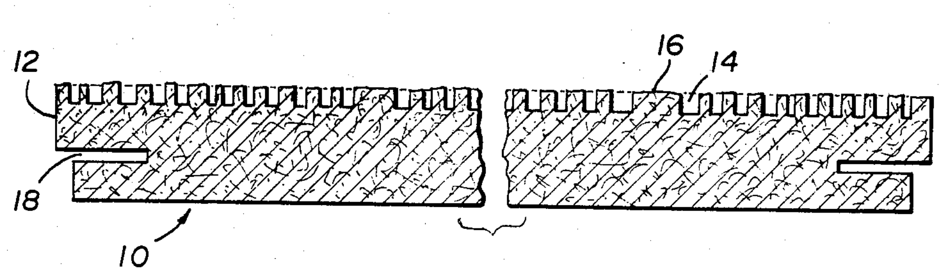
FIG. 2 is a cross-section of FIG. 1 along line 2—2.

More particularly, referring to FIGS. 1 and 2 there is shown a tile 10 of a fiber composition body 12 such as of mineral fiber exhibiting on the face surface thereof a pattern of recessed crevices, or valleys 14, and raised portions, or hills 16; the tile further being provided with conventional slots or grooves 18 for installation purposes. In strikingly dramatic contrast to the shallow, roughly defined and crudely reproduced representations of design patterns found on tiles of the prior art, the tile 10 exhibits a sharply delineated high-fidelity reproduction of the corresponding hills 44 and valleys 46 in the three-dimensional design matrix 48 of FIGS. 3 and 4. Thereby the raised portions 44 of the design matrix are accurately reproduced as the valleys 14 of tile 10. In conventional production of acoustical panels it was found that fidelity impressions of the design were being denied in part because the fiber mixture forming the hills was being compressed within the design cavities of the prior art rolls and air was being trapped between the fiber composition and the design cavity. As the roll turned the pulp mushroomed out of shape upon release of the trapped air and upon release of compression on the resilient pulp. The present invention obviates these and other problems caused by trapped air and natural pulp resiliency and non-compressibility in both casting and water felting operations by using a hollow core embossing roll assembly 30 as more particularly shown in FIGS. 3 and 4.

Figure 3:
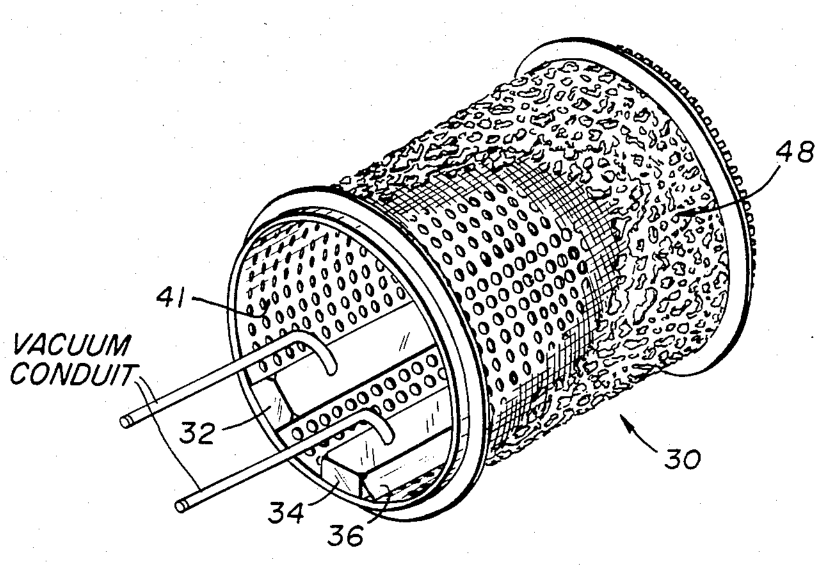
FIG. 3 is a perspective view of a portion of the molding roller assembly partly cut away to show teachings of this invention.
Figure 4:
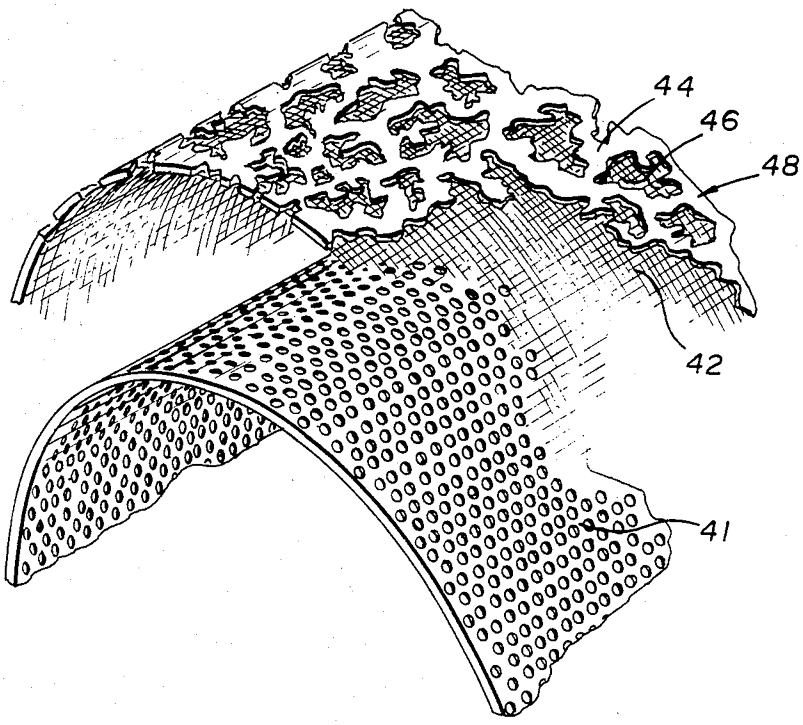
FIG. 4 is a partial exploded segment of the apparatus of FIG. 3.

The embossing roll assembly 30 comprises an inner perforated hollow cylinder 41 covered by screen 42 backing to which a molding matrix 48 is integrally affixed in a discontinuous pattern of raised portions 44 and openings 46 pattern. The molding matrix 48 is composed of a hard plastic, preferably polyethylene, polypropylene, TEFLON resin polymer or other similar plastic materials which will readily release the wet pulp. the molding matrix 48 may be formed and simultaneously integrated with screen 42 backing by casting liquid plastic material onto an open mesh wire cloth or compatible plastic screen 42, preferably of nominal 10–50 U.S. mesh opening. Larger or smaller mesh sizes may be utilized depending on the drainage characteristics of the particular pulp, the openings being sufficient to allow air and water passage easily through the openings without substantial passage of the pulp. The matrix 48 may also be formed of liquid plastic cast around a master mold shaped in the desired pattern or cast as a solid sheet and subsequently etched, routed or carved in any particular definitive pattern. The pattern may be as shown in the drawings or various floral, geometric and the like designs as desired. The roll assembly 30 may be mounted so as to rotate freely by the force of the mat moving underneath it or to be power driven for thick cast pulp and further optionally be equipped with a vacuum slice 32, positive air pressure means 34 or scraping means 36 as shown in FIG. 3 of the drawing; each of the foregoing dependent upon the viscous nature, freeness of drainage and line speed of the particular pulp being processed.

For operation on free-draining, low viscosity pulps such as in a high speed continuous water-felting Fourdrinier operation, the roll assembly 30 is mounted on the conveying line so as to be driven by the movement of the mat passing underneath it, in order to maintain the high line speeds generally desired in such operations. The roll assembly 30 will be located over the formed mat after the vacuum drainage section and prior to the coating roll sections; and preferably assembly 30 will be equipped with a vacuum slice 32 in order to obtain good fidelity in creating the pattern while removing the additional drainage water. At this point in the line operation the formed mat will have a solids content of about 20% to 30% and while passing under roll assembly 30 equipped with vacuum slice 32 a deep, straight sided and sharp edged pattern of valleys 14 and hills 16 will be formed in tile 10 while dewatering the mat further to about 25–40% solids content.

Figure 5:
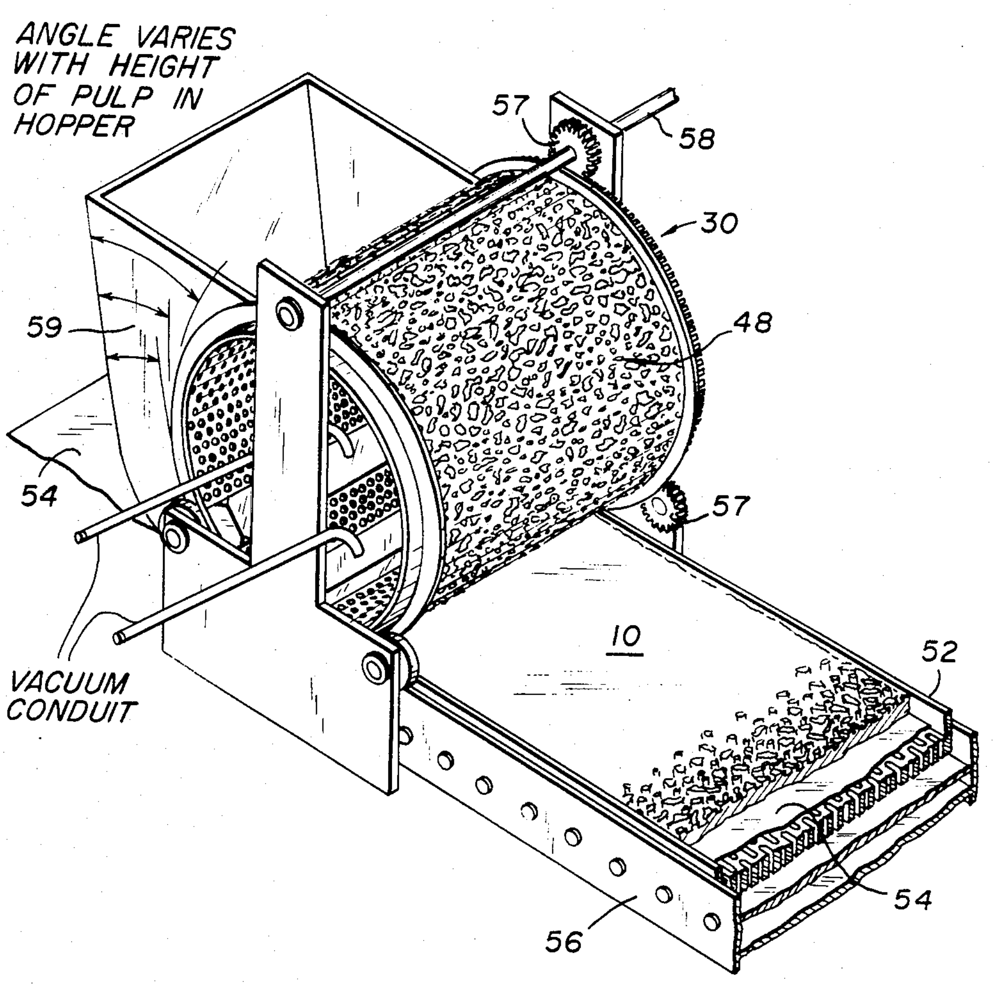
FIG. 5 diagrammatically represents a portion of a tile casting line on which a feeder supplies a viscous aqueous pulp to trays carried on a conveyor passing under a molding roll assembly employing the teachings of this invention.

In operation on viscous pulps such as the highly swellable thick pulp fibers in a tray casting operation, the roll assembly 30 will generally be driven by means of a motor and not equipped with a vacuum. This is shown more particularly in FIG. 5 depicting a portion of such a line in which forming trays 52 and linings 54 of metal foil or paper are placed onto the moving conveyor 56. As shown in FIG. 5 the roll assembly 30 is mounted on conveyor 56 and driven by means of gears 57 connected by drive shaft 58 to a motor not shown. The fiber pulp fed into optional hopper 59 is in a very thick, viscous state comprising about 60–80% solids and exhibiting a consistency similar to wet oatmeal. The angle and distance between matrix 48 and hopper 59 is determined by the amount and pressure required for that particular pulp to enter the rotating interstices 46 in the matrix 48. As the roll 30 rotates it draws viscous pulp down the converging sides of feed hopper 59 and fills the interstices 46 of the discontinuous pattern within matrix 48. The roll 30 may optionally be equipped to assist in releasing the viscous pulp from the face of the matrix with means of positive air pressures such as compressed air vent 34. Further, roll 30 may optionally be provided with an extending leading edge scraping means 36 to the air vent 34 so as to scrape off any seepage of pulp into the interior of the cylinder. As the drum continues to rotate wpwardly it may be further optionally sprayed by pressurized water and/or air (not shown) or both lines in sequences so as to cleanse the cylinder 41, screen 42 and matrix 48 of any residual pulp; such residue being conveyed by convenient gutters not shown to disposal e.g., into a waste receptacle. Thereupon the released molded tile 10 is passed on to conventional subsequent operations not shown e.g. drying, cutting; decorating and the like.

In operations with highly viscous and very thick fiber compositions, the roller 30 may be equipped with all of the optional vacuum slice 32 negative air pressure means and positive air pressure means 34 both communicating through the roll 30 and screen 44 and between the discontinuous portions of matrix 48 patterned so as to cooperatively pull and push the pulp between the discontinuous portions of the matrix and against the screen to form high-fidelity reproductions of the matrix 48 in such pulps. Further in such a situation it may be desirable to include a helical doctor blade (not shown) in order to scrape any pulp oozing through the negative and positive air pressure assist means whereby any residual pulp that might come through between the interstices 46 of the matrix 48 and the openings in the screen 42 and perforated cylinder 41 may be removed from the interior thereof and sent to waste disposal or return for recycling in the process.

From the foregoing, it is apparent that the present invention provides an apparatus for producing a high-fidelity molded surface on acoustical panels and reproducing a three-dimensional design therein in various highly variable fiber pulp formulations. It is to be understood therefore that various additions, modifications and changes to obtain optimum performance with particular pulps may be resorted to without departing from the spirit of this invention.

What is claimed is:

1. An embossing roller apparatus, for producing a high fidelity, sharply delineated three-dimensional pattern in the surface of fiber acoustical tile comprising a hollow cylinder, said cylinder containing a plurality of perforations penetrating therethrough, a screen overlaying said cylinder;

and a three-dimensional, discontinuous pattern matrix of plastic overlaying said screen and said screen being imbedded in said matrix whereby interstices in said matrix communicate with perforations in said cylinder to allow passage of air without substantial passage of fiber.

2. The apparatus of claim 1 in which said screen is an about 10–40 U.S. standard mesh screen.

3. The apparatus of claim 1 in which said matrix comprises polyethylene.

* * * * *